United States Patent
Kwon et al.

(10) Patent No.: US 11,938,569 B2
(45) Date of Patent: Mar. 26, 2024

(54) WINDOW AND METHOD OF MANUFACTURING THE SAME

(71) Applicant: Samsung Display Co., Ltd., Yongin-si (KR)

(72) Inventors: Yong-Hoon Kwon, Suwon-si (KR); Byunghoon Kim, Hwaseong-si (KR); Taeoh Kim, Suwon-si (KR); Jaebeen Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 15 days.

(21) Appl. No.: 17/525,199

(22) Filed: Nov. 12, 2021

(65) Prior Publication Data

US 2022/0203479 A1    Jun. 30, 2022

(30) Foreign Application Priority Data

Dec. 24, 2020  (KR) .................. 10-2020-0182756

(51) Int. Cl.
  *B23K 26/364*    (2014.01)
(52) U.S. Cl.
  CPC .................. *B23K 26/364* (2015.10)
(58) Field of Classification Search
  CPC .................................. B23K 26/364
  See application file for complete search history.

(56) References Cited

U.S. PATENT DOCUMENTS

| | | | | |
|---|---|---|---|---|
| 3,685,666 | A * | 8/1972 | Rose | G09F 15/0068 40/605 |
| 9,354,476 | B2 * | 5/2016 | Han | G06F 1/1616 |
| 9,676,649 | B2 * | 6/2017 | Dobbins | C03C 19/00 |
| 10,314,184 | B2 * | 6/2019 | Choi | H05K 5/0226 |
| 10,442,719 | B2 * | 10/2019 | Marjanovic | B23K 26/361 |

(Continued)

FOREIGN PATENT DOCUMENTS

| | | |
|---|---|---|
| CN | 109523923 | 3/2019 |
| KR | 20170122554 A * | 11/2017 |

(Continued)

OTHER PUBLICATIONS

Tz-Cheng Chiu et al., "On the mechanics of laser peeling for ultra-thin glasses", Engineering Fracture Mechanics, Jul. 9, 2016, pp. 236-247, vol. 163.

(Continued)

*Primary Examiner* — Cachet I Proctor
(74) *Attorney, Agent, or Firm* — KILE PARK REED & HOUTTEMAN PLLC

(57) ABSTRACT

A manufacturing method of a window includes providing a window including a first non-folding portion, a second non-folding portion, and a folding portion disposed between the first and second non-folding portions and irradiating a laser beam to a front surface of the folding portion of the window to form a first groove in the front surface of the folding portion. The first and second non-folding portions and the folding portion are arranged in the window in a first direction, first processing areas extending in a second direction intersecting the first direction and arranged in the first direction are defined in the front surface of the folding portion, and the laser beam is irradiated at least once to each of the first processing areas in the second direction.

18 Claims, 15 Drawing Sheets

(56) References Cited

U.S. PATENT DOCUMENTS

| | | | |
|---|---|---|---|
| 11,594,640 B2* | 2/2023 | Ko | H01L 27/1225 |
| 2017/0084673 A1* | 3/2017 | Lee | H10K 50/84 |
| 2018/0120997 A1* | 5/2018 | Moon | H10K 59/1213 |
| 2018/0132371 A1* | 5/2018 | Yeum | B32B 17/00 |
| 2018/0150108 A1* | 5/2018 | Song | G06F 1/1677 |
| 2018/0182983 A1* | 6/2018 | Bae | B32B 9/045 |
| 2018/0267574 A1* | 9/2018 | Cho | H04M 1/0268 |
| 2018/0321708 A1* | 11/2018 | Wu | G06F 3/0443 |
| 2019/0346887 A1* | 11/2019 | Park | G06F 1/1681 |
| 2020/0183457 A1* | 6/2020 | Youn | G06F 1/1641 |
| 2020/0333522 A1* | 10/2020 | Kang | G02B 5/3033 |
| 2020/0392038 A1* | 12/2020 | Park | H04M 1/0266 |
| 2021/0107829 A1* | 4/2021 | Chen | G06F 1/1637 |
| 2021/0337688 A1* | 10/2021 | Ge | H10K 59/12 |

FOREIGN PATENT DOCUMENTS

| | | |
|---|---|---|
| KR | 10-2018-0079093 | 7/2018 |
| KR | 10-2150391 | 9/2020 |

OTHER PUBLICATIONS

Z. K. Wang et al., "Investigation on CO2 laser irradiation inducing glass strip peeling for microchannel formation", Biomicrofluidics, Mar. 15, 2012, pp. 1-12, vol. 6, No. 012820.

* cited by examiner

WINDOW AND METHOD OF MANUFACTURING THE SAME

CROSS-REFERENCE TO RELATED APPLICATION(S)

This U.S. non-provisional patent application claims priority to and the benefit of Korean Patent Application No. 10-2020-0182756 under 35 U.S.C. § 119, filed in the Korean Intellectual Property Office (KIPO) on Dec. 24, 2020, the entire contents of which are incorporated herein by reference.

BACKGROUND

1. Technical Field

The disclosure relates to a window and a method of manufacturing the window.

2. Description of Related Art

A display device includes a display panel displaying an image and a window disposed on the display panel to protect the display panel, and the display panel includes pixels and a driver driving the pixels.

The window that protects the display panel from external impacts and scratches includes a glass or plastic material.

In recent years, a flexible display device that is folded or rolled is being developed, and the flexible display device includes non-folding portions and a folding portion disposed between the non-folding portions.

In case that the folding portion is folded, the display device is folded along with the folding portion.

Nowadays, with the technological development for the foldable display device, technologies to easily fold the window in the folding portions are required.

SUMMARY

The disclosure provides a window to which a slimming process capable of reducing a process time and a manufacturing cost without using hazardous materials is applied.

Embodiments of the disclosure provide a method of manufacturing a window. The manufacturing method of the window may include providing the window including a first non-folding portion, a second non-folding portion, and a folding portion disposed between the first and second non-folding portions and irradiating a laser beam to a front surface of the folding portion of the window to form a first groove in the front surface of the folding portion. The first non-folding portion, the second non-folding portions, and the folding portion in the window in a first direction may be arranged, a plurality of first processing areas extending in a second direction intersecting the first direction and arranged in the first direction may be defined in the front surface of the folding portion, and the laser beam may be irradiated at least once to each of the plurality of first processing areas in the second direction.

The laser beam may include a $CO_2$ laser beam.

The laser beam may have a wavelength in a range of about 9 μm to about 11 μm.

The laser beam may have a power in a range of about 20 W to about 70 W.

A power of the laser beam irradiated to the plurality of first processing areas may be uniformly maintained.

The plurality of first processing areas may partially overlap each other in the first direction.

The laser beam may be irradiated to a k-th first processing area among the first plurality of processing areas in the second direction and may be moved in the first direction to be irradiated to a k+1-th first processing area among the plurality of first processing areas in the second direction, where k is a natural number.

The method may further include irradiating the laser beam to a rear surface of the folding portion to form a second groove in the rear surface of the folding portion, which is opposite to the front surface of the folding portion. A plurality of second processing areas extending in the second direction and arranged in the first direction may be defined in the rear surface of the folding portion, and the laser beam may be irradiated at least once to each of the plurality of second processing areas in the second direction.

The plurality of second processing areas partially overlap each other in the first direction.

The first groove and the second groove which are formed by processing the first and second processing areas may have a wave pattern.

The plurality of first processing areas may be spaced apart from each other in the first direction, and the plurality of second processing areas may be spaced apart from each other in the first direction.

The plurality of second processing areas may overlap the plurality of first processing areas in a plan view.

The plurality of second processing areas may be arranged alternately with the plurality of first processing areas in a plan view.

The first groove may include a plurality of first sub-grooves formed by the plurality of first processing areas, the second groove may include a plurality of second sub-grooves formed by the plurality of second processing areas, the plurality of first sub-grooves may be spaced apart from each other in the first direction, and the plurality of second sub-grooves may be spaced apart from each other in the first direction.

The laser beam may be irradiated to a k-th first processing area among the plurality of first processing areas in the second direction and may be moved in the first direction to be irradiated to a k+1-th first processing area among the plurality of first processing areas in the second direction, where k is a natural number, and the laser beam irradiated to the k-th first processing area may have a power different from a power of the laser beam irradiated to the k+1-th first processing area.

The power of the laser beam may be equal to or greater than a first power and equal to or smaller than a second power that is greater than the first power.

The laser beam having the first power may be irradiated to a first processing area disposed at an outermost position among the plurality of first processing areas, and the laser beam having the second power may be irradiated to a first processing area disposed at a center portion among the plurality of first processing areas.

The power of the laser beam may be gradually changed from the first power to the second power from the first processing area disposed at the outermost position to the first processing area disposed at the center portion.

A k-th first processing area among the plurality of first processing areas may include a plurality of first sub-processing areas arranged in the second direction and spaced apart from each other, where k is a natural number, and the laser beam may be irradiated at least once to the plurality of first sub-processing areas to allow the first groove to include dot-type first sub-grooves.

A bottom surface defined in the first groove may be a curved surface or a flat surface.

Embodiments of the disclosure provide a window including a first non-folding portion, a second non-folding portion, and a folding portion disposed between the first and second non-folding portions and provided with a first groove and a second groove which are respectively formed in a front surface and a rear surface of the folding portion. The first and second non-folding portions and the folding portion may be arranged in a first direction, and each of the first and second grooves may include a plurality of sub-grooves extending in a second direction intersecting the first direction and arranged in the first direction to form a wave pattern.

The folding portion may have a thickness that is equal to or smaller than about two-thirds (⅔) of a thickness of the first and second non-folding portions.

Embodiments of the disclosure provide a method of manufacturing a window. The manufacturing method of the window may include providing the window including a first non-folding portion, a second non-folding portion, and a folding portion disposed between the first and second non-folding portions and irradiating a laser beam to a front surface of a folding portion of the window to form a first groove in the front surface of the folding portion. The first non-folding portion, the second non-folding portion, and the folding portion in the window in a first direction may be arranged, a plurality of first processing areas partially overlapping each other may be defined in the front surface of the folding portion, the laser beam may be sequentially irradiated to the plurality of first processing areas.

Embodiments of the disclosure provide a method of manufacturing a window. The manufacturing method of the window may include providing the window including a first non-folding portion, a second non-folding portion, and a folding portion disposed between the first and second non-folding portions and irradiating a laser beam to a front surface of a folding portion of the window to form a first groove in the front surface of the folding portion. The first non-folding portion, the second non-folding portion, and the folding portion in the window in a first direction may be arranged, a plurality of first processing areas extending in a second direction intersecting the first direction and arranged in the first direction may be defined in the front surface of the folding portion, and the laser beam may be irradiated at least once to an entire portion of the folding portion, and the laser beam irradiated to the folding portion may have a quadrangular shape or a circular shape when viewed in the first direction.

According to the above, since the non-folding portions of the window have a relatively great thickness, a strength and a surface quality are improved in the non-folding portions. Since the folding portion of the window has a relatively small thickness, the window is easily folded in the folding portion.

The laser beam is used to thin the folding portion of the window, and thus, a chemical etching process to etch the folding portion is omitted. Since no hazardous substances are used in the manufacturing process, the environment that includes products and processes is safe and a process time is shortened. The $CO_2$ laser beam, which is relatively low-cost compared with a picosecond layer beam or a femtosecond laser beam, is used, and a manufacturing cost is reduced.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION OF THE EMBODIMENTS

Figure 1:
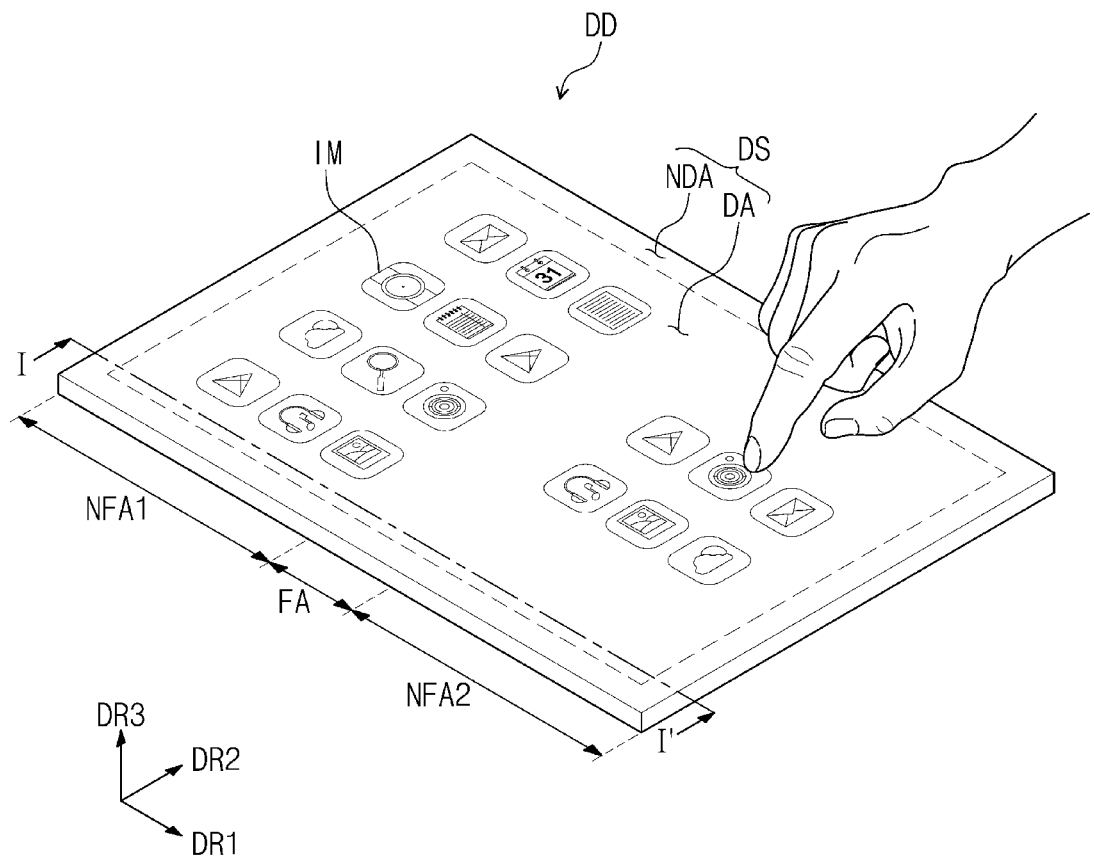
FIG. 1 is a perspective view schematically illustrating a display device including a window according to an embodiment of the disclosure.

In the disclosure, it will be understood that when an element or layer is referred to as being "on," "connected to," or "coupled to" another element or layer, it can be directly on, connected or coupled to the other element or layer or intervening elements or layers may be present. In contrast, when an element is referred to as being "directly on," "directly connected to," or "directly coupled to" another element or layer, there are no intervening elements or layers present.

Like numerals refer to like elements throughout. In the drawings, the thickness, ratio, and dimension of components may be exaggerated for effective description of the technical content.

As used herein, the term "and/or" includes any and all combinations of one or more of the associated listed items.

It will be understood that, although the terms first, second, and the like may be used herein to describe various elements, these elements should not be limited by these terms. These terms are only used to distinguish one element from another element. Thus, a first element discussed below could be termed a second element without departing from the teachings of the disclosure. As used herein, the singular forms, "a," "an," and "the" are intended to include the plural forms as well, unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures.

The phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and disclosure, and should not be interpreted in an ideal or excessively formal sense unless expressly so defined herein.

It will be further understood that the terms "include," "comprise," "have" and/or their variations, when used in this specification, specify the presence of stated features, integers, steps, operations, elements, and/or components, but do not preclude the presence or addition of one or more other features, integers, steps, operations, elements, components, and/or groups thereof.

Hereinafter, the disclosure will be explained in detail with reference to the accompanying drawings.

Figure 2:
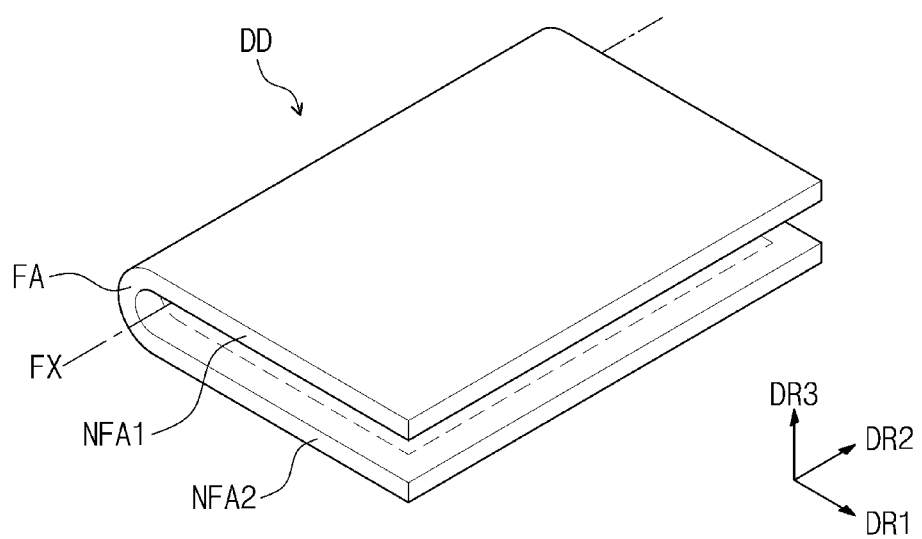
FIG. 2 is a perspective view schematically illustrating a folded state of the display device shown in FIG. 1.

FIG. 1 is a schematic perspective view showing a display device DD including a window according to an embodiment, and FIG. 2 is a schematic perspective view illustrating a folded state of the display device DD shown in FIG. 1.

Referring to FIG. 1, the display device DD according to the embodiment may have a rectangular shape defined by long sides extending in a first direction DR1 and short sides extending in a second direction DR2 intersecting the first direction DR1. However, the shape of the display device DD is not limited to the rectangular shape, and the display device DD may have a variety of shapes, such as a circular shape and a polygonal shape. The display device DD may be a flexible display device.

Hereinafter, a direction substantially perpendicular to a surface defined by the first direction DR1 and the second direction DR2 may be referred to as a third direction DR3. In the disclosure, the expression "when viewed in a plan view" may mean a state of being viewed in the third direction DR3.

The display device DD may include a folding portion FA and non-folding portions NFA1 and NFA2. The non-folding portions NFA1 and NFA2 may include a first non-folding portion NFA1 and a second non-folding portion NFA2. The folding portion FA may be disposed between the first non-folding portion NFA1 and the second non-folding portion NFA2. The first non-folding portion NFA1, the folding portion FA, and the second non-folding portion NFA2 may be arranged in the first direction DR1.

In the embodiment, a folding portion FA and two non-folding portions NFA1 and NFA2 are shown as an example, however, the number of the folding portions FA and the number of non-folding portions NFA1 and NFA2 are not limited thereto or thereby. For example, the display device DD may include more than two non-folding portions and folding portions disposed between the non-folding portions.

An upper surface of the display device DD may be referred to as a display surface DS and may be a plane surface defined by the first direction DR1 and the second direction DR2. Images IM generated by the display device DD may be provided to a user through the display surface DS.

The display surface DS may include a display area DA and a non-display area NDA around the display area DA. The display area DA displays an image, and the non-display area NDA does not display the image. The non-display area NDA surrounds the display area DA and defines an edge of the display device DD, which is printed by a predetermined color.

Referring to FIG. 2, the display device DD may be, but not limited to, a foldable display device DD that is folded or unfolded. The folding portion FA may be folded about a folding axis FX substantially parallel to the second direction DR2, and thus, the display device DD may be folded. The folding axis FX may be defined as a minor axis substantially parallel to the short sides of the display device DD.

In case that the display device DD is folded, the first non-folding portion NFA1 and the second non-folding portion NFA2 face each other, and thus, the display device DD may be inwardly folded (in-folded) such that the display surface DS is not exposed to the outside.

Figure 3:
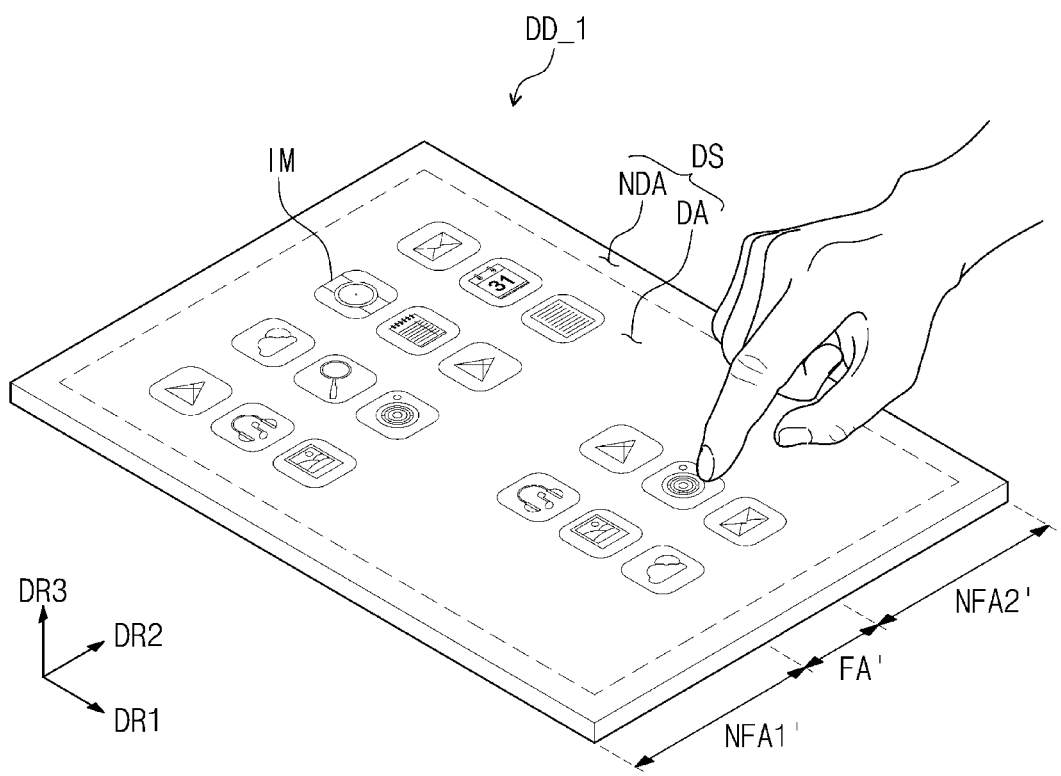
FIG. 3 is a perspective view schematically illustrating a display device including a window according to an embodiment of the disclosure.
Figure 4:
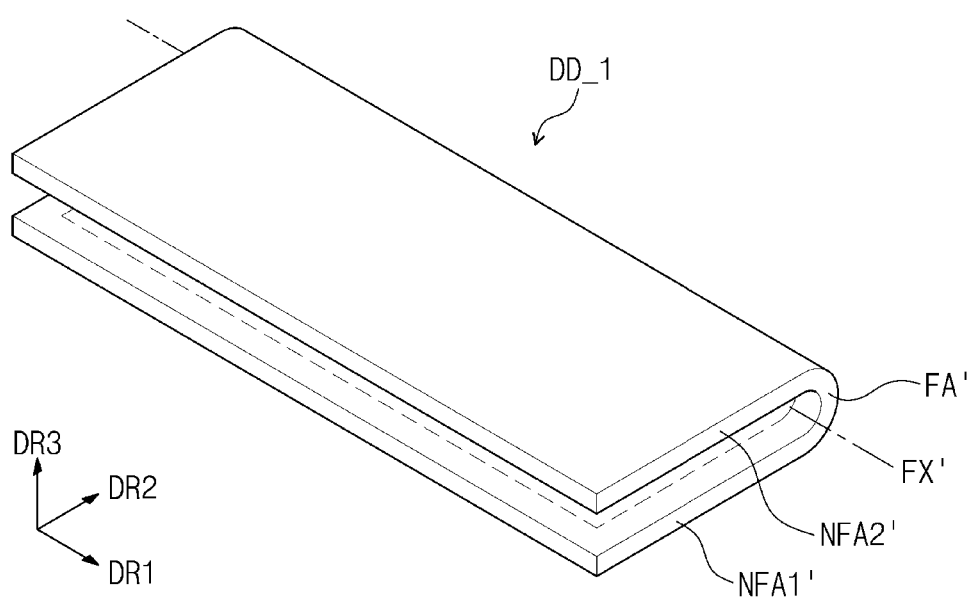
FIG. 4 is a perspective view schematically illustrating a folded state of the display device shown in FIG. 3.

FIG. 3 is a perspective view schematically illustrating a display device DD-1 including a window according to an embodiment, and FIG. 4 is a perspective view schematically illustrating a folded state of the display device DD-1 shown in FIG. 3.

The display device DD_1 shown in FIG. 3 may have a configuration substantially similar or identical to that of the display device DD shown in FIG. 1 except for a folding operation. Accordingly, the folding operation of the display device DD_1 will be mainly described below.

Referring to FIGS. 3 and 4, the display device DD_1 may include a folding portion FA' and non-folding portions NFA1' and NFA2'. The non-folding portions NFA1' and NFA2' may include a first non-folding portion NFA1' and a second non-folding portion NFA2'. The folding portion FA' may be disposed between the first non-folding portion NFA1' and the second non-folding portion NFA2'. The first non-folding portion NFA1', the folding portion FA', and the second non-folding portion NFA2' may be arranged in the second direction DR2.

The folding portion FA' is folded about a folding axis FX' substantially parallel to the first direction DR1, and thus, the display device DD_1 may be folded. The folding axis FX' may be defined as a major axis substantially parallel to the long sides of the display device DD_1. The display device DD shown in FIG. 1 may be folded about the minor axis, and the display device DD_1 shown in FIG. 3 may be folded about the major axis. The display device DD_1 may be inwardly folded (i.e., in-folded) such that the display surface DS is not exposed to the outside.

Hereinafter, the structure of the display device DD folded about the minor axis will be described.

Figure 5:
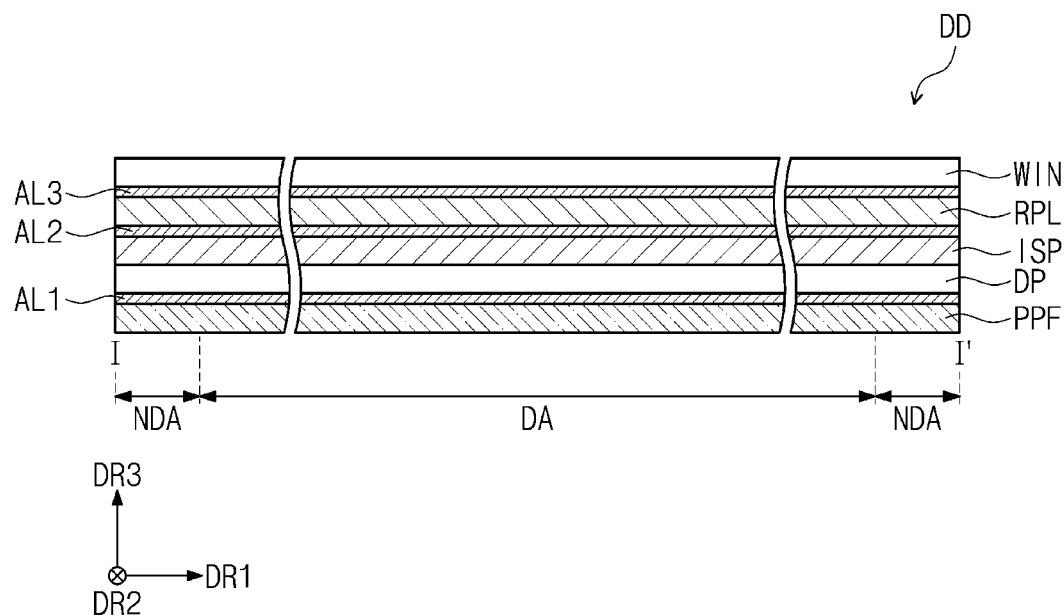
FIG. 5 is a schematic cross-sectional view taken along line I-I' shown in FIG. 1.

FIG. 5 is a schematic cross-sectional view taken along line I-I' shown in FIG. 1.

Referring to FIG. 5, the display device DD may include a display panel DP, an input sensing part ISP, an anti-reflective layer RPL, a window WIN, a panel protective film PPF, and first, second, and third adhesive layers AL1, AL2, and AL3.

The display panel DP may be a flexible display panel. The display panel DP may be a light-emitting type display panel, however, it should not be particularly limited. For instance, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot or a quantum rod. Hereinafter, the organic light emitting display panel will be described as an example of the display panel DP.

The input sensing part ISP may be disposed on the display panel DP. The input sensing part ISP may include sensors (not shown) to sense an external input by a capacitive method. The input sensing part ISP may be manufactured directly on the display panel DP when the display panel DP is manufactured. However, it should not be limited thereto or thereby, and the input sensing part ISP may be attached to the display panel DP by an adhesive layer after being manufactured separately from the display panel DP.

The anti-reflective layer RPL may be disposed on the input sensing part ISP. The anti-reflective layer RPL may reduce a reflectance of the external light incident on the display panel DP from the above of the display device DD. As an example, the anti-reflective layer RPL may include a retarder and/or a polarizer.

The window WIN may be disposed on the anti-reflective layer RPL. The window WIN may protect the display panel DP, the input sensing part ISP, and the anti-reflective layer RPL from external scratches and impacts.

The panel protective film PPF may be disposed under the display panel DP. The panel protective film PPF may protect a lower portion of the display panel DP. The panel protective film PPF may include a flexible plastic material such as polyethylene terephthalate (PET).

The first adhesive layer AL1 may be disposed between the display panel DP and the panel protective film PPF. The display panel DP and the panel protective film PPF may be coupled (or connected) to each other by the first adhesive layer AL1.

The second adhesive layer AL2 may be disposed between the anti-reflective layer RPL and the input sensing part ISP. The anti-reflective layer RPL and the input sensing part ISP may be coupled to each other by the second adhesive layer AL2.

The third adhesive layer AL3 may be disposed between the window WIN and the anti-reflective layer RPL. The window WIN and the anti-reflective layer RPL may be coupled to each other by the third adhesive layer AL3.

Figure 6:
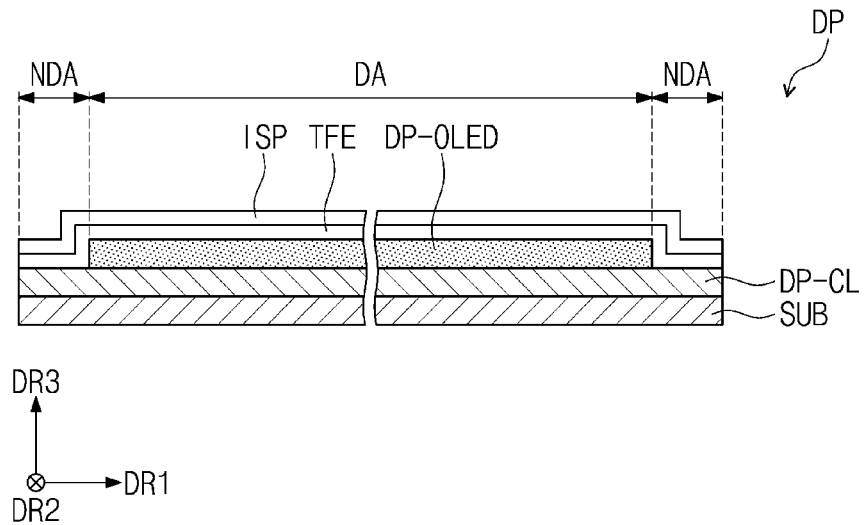
FIG. 6 is a cross-sectional view schematically illustrating a display panel shown in FIG. 5.

FIG. 6 is a cross-sectional view schematically illustrating the display panel DP shown in FIG. 5.

Referring to FIG. 6, the display panel DP may include a substrate SUB, a circuit element layer DP-CL disposed on the substrate SUB, a display element layer DP-OLED disposed on the circuit element layer DP-CL, and a thin-film encapsulation layer TFE disposed on the display element layer DP-OLED. The input sensing part ISP may be disposed on the thin-film encapsulation layer TFE.

The substrate SUB may include a display area DA and a non-display area NDA around the display area DA. The substrate SUB may include a flexible plastic material. For example, the substrate SUB may include polyimide (PI). The display element layer DP-OLED may be disposed in the display area DA.

The circuit element layer DP-CL may include an insulating layer, a semiconductor pattern, a conductive pattern, and a signal line. An insulating layer, a semiconductor layer, and a conductive layer may be formed on the substrate SUB by coating and depositing processes. The insulating layer, the semiconductor layer, and the conductive layer may be selectively patterned by a photolithography process, and thus, a semiconductor pattern, a conductive pattern, and a signal line may be formed.

The circuit element layer DP-CL may include transistors formed by the semiconductor pattern, the conductive pattern, and the signal line. The display element layer DP-OLED may include light emitting elements electrically connected to the transistors. Pixels may include the transistors and the light emitting elements.

The thin-film encapsulation layer TFE may be disposed on the circuit element layer DP-CL to cover the display element layer DP-OLED. The thin-film encapsulation layer TFE may include an inorganic layer, an organic layer, and an inorganic layer which are sequentially stacked. The inorganic layer may include an inorganic material and may protect the pixels from moisture and oxygen. The organic layer may include an organic material and may protect the pixels from a foreign substance such as dust particles.

The input sensing part ISP may include sensors (not shown) to sense an external input. The sensors may sense the external input by the capacitive method. The external input may include a variety of inputs caused by a part of a user's body, light, heat, pen, pressure, or the like.

Hereinafter, a method of manufacturing a window WN will be described in detail with reference to FIGS. 7 to 12.

Figure 7:
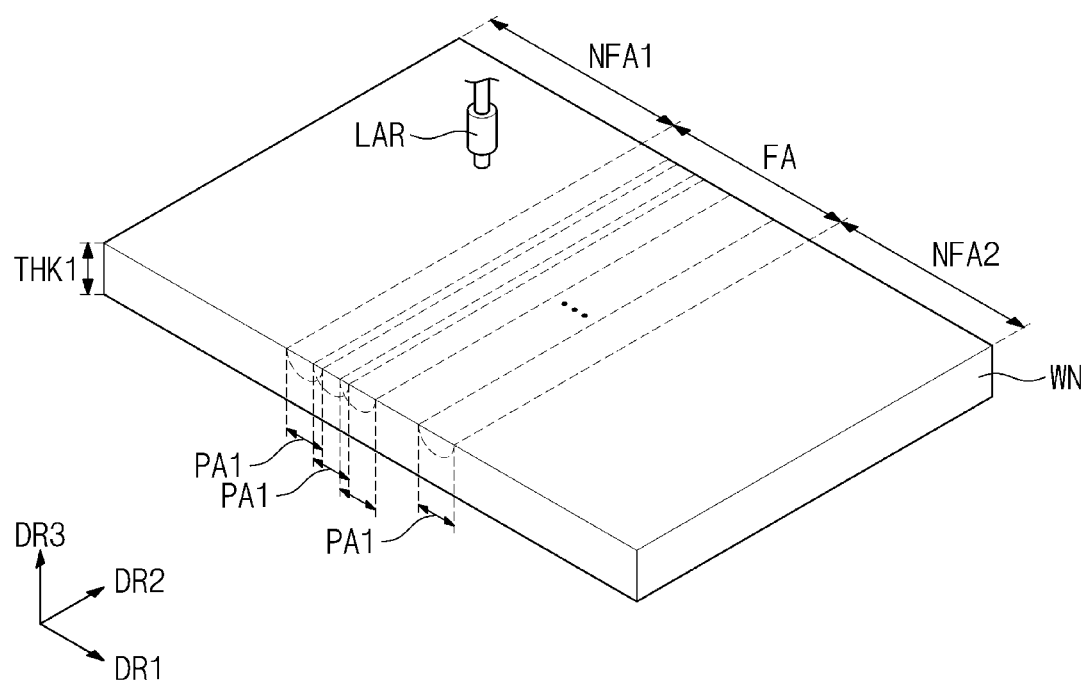
FIG. 7 is a perspective view schematically illustrating processing areas defined in a window according to an embodiment of the disclosure.

FIG. 7 is a perspective view schematically illustrating processing areas PA1 defined in the window WN according to an embodiment.

Referring to FIG. 7, the window WN may include a folding portion FA and non-folding portions NFA1 and NFA2 which correspond to those of the display device DD shown in FIG. 1. The folding portion FA may be disposed between the first non-folding portion NFA1 and the second non-folding portion NFA2. The window WN shown in FIG. 7 may be a window before the folding portion FA is processed.

First processing areas PA1 may be defined in the folding portion FA of the window WN. An upper surface of the first processing areas PA1 may have a rectangular shape defined by short sides in the first direction DR1 and long sides in the second direction DR2. A lower surface of the first processing areas PA1 may have a curved surface convex in the third direction DR3.

The window WN may have a first thickness THK1. The first thickness THK1 may be within a range of about 50 μm to about 150 μm. However, the thickness THK1 should not be limited thereto or thereby, and the first thickness THK1 of the window WN may have various values.

The first processing areas PA1 may be arranged in the first direction DR1. The first processing areas PA1 may partially overlap each other in the first direction DR1, however, they should not be limited thereto or thereby. The first processing areas PA1 may be disposed adjacent to each other or spaced apart from each other.

A laser beam generator LAR may be disposed above the folding portion FA of the window WN. The laser beam generator LAR may be spaced apart from the window WN in the third direction DR3.

The laser beam generator LAR may generate a laser beam and may apply the laser beam to the folding portion FA of the window WN. The laser beam may be irradiated at least once in the second direction DR2 to each of the first processing areas PA1 of the folding portion FA. For example, the laser beam may be irradiated to a k-th first processing area PA1 of the folding portion FA in the second direction DR2 and then, may be irradiate to a k+1-th first processing area PA1 in the second direction DR2 after moving in the first direction DR1 (where k may be a natural number).

Hereinafter, a processing operation for a front surface WFP of the folding portion FA of the window WN will be described with reference to FIGS. 8A to 10.

Figure 8A:
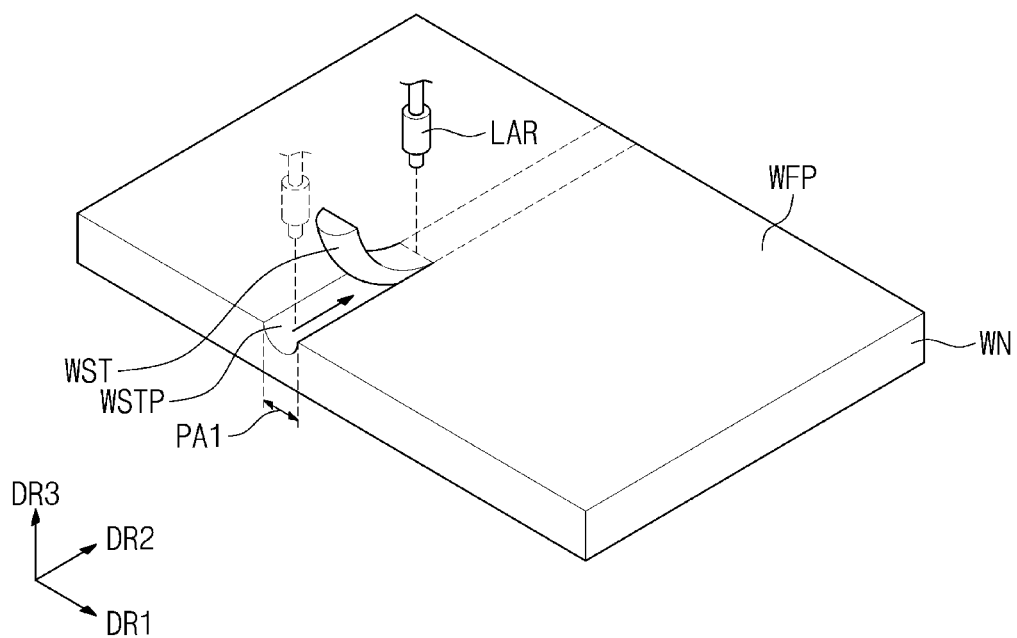
FIGS. 8A to 8C are views schematically illustrating a first processing area of a window, which is processed by a laser beam.
Figure 8B:
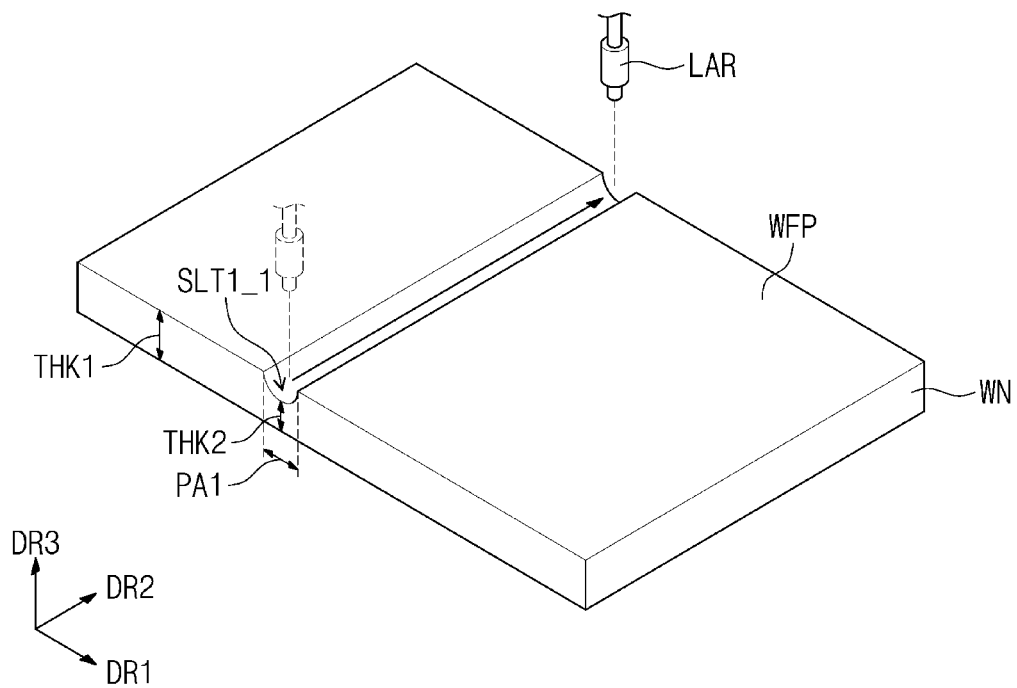
Figure 8C:
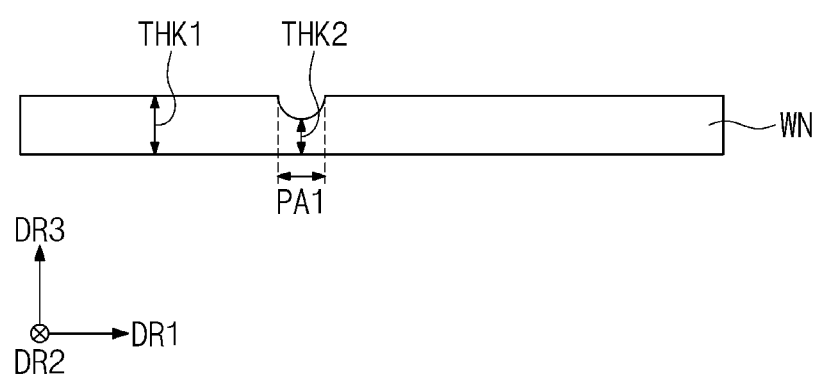

FIGS. 8A to 8C are views schematically illustrating the first processing area PA1 of the window WN processed by the laser beam.

As an example, FIG. 8C is a schematic view of the window WN shown in FIG. 8A when the window WN is viewed in the second direction DR2. FIGS. 8A to 8C are views schematically illustrating a method of processing a first processing area PA1. As an example, the first processing area PA1 disposed on a leftmost side may be processed.

Referring to FIG. 8A, the laser beam generator LAR may generate a $CO_2$ laser beam. The $CO_2$ laser beam may have a wavelength in a range of about 9 μm to about 11 μm. The energy of the $CO_2$ laser beam may be absorbed better by a surface of the window WN than that of a laser beam with other wavelengths.

The power of the laser beam generator LAR may be in a range of about 20 W to about 70 W, however, it should not be limited thereto or thereby. The power of the laser beam generator LAR may be set variously depending on a thickness of the surface of the window WN, which is to be stripped.

The laser beam generator LAR may be disposed on the front surface WFP of the window WN. The laser beam generator LAR may be disposed in the first processing area PA1. The laser beam generator LAR may irradiate the laser beam to the first processing area PA1 while moving from the first processing area PA1 in the second direction DR2.

The surface of the window WN at which the laser beam is irradiated may be peeled off and separated from the window WN. A portion of the surface of the window WN, which is peeled off from the window WN, may be defined as a strip WST.

An upper surface of the strip WST may have a plane in the first and second directions DR1 and DR2, and a lower surface of the strip WST may have a curved surface convex in the third direction DR3. For example, the strip WST may have a semi-circular cylindrical shape extending in the second direction DR2, however, it should not be limited thereto or thereby. The strip WST may have a variety of shapes depending on the type and intensity of the laser beam.

The surface of the window WN from which the strip WST is separated may be defined as a strip surface WSTP. The strip surface WSTP may correspond to the convexly curved surface of the strip WST separated from the window WN. The strip surface WSTP may have a curved surface that is concave downward and extends in the second direction DR2. The strip surface WSTP may be defined as a groove.

The strip surface WSTP may be polished using the laser beam. Polishing may mean a process of creating a smooth and shiny surface as a mirror. Accordingly, the strip surface WSTP may not require a separate polishing process to polish the surface of the window.

Referring to FIGS. 8B and 8C, the laser beam may be irradiated from a side surface of the first processing area PA1 to another side surface of the first processing area PA1, and the surface of the window WN onto which the laser beam is irradiated may be peeled from the window WN and may be completely separated from the window WN. For example, the strip WST shown in FIG. 8A may be separated from the window WN.

A 1-1-th sub-groove SLT1_1 may be formed in the processed first processing area PA1. The 1-1-th sub-groove SLT1_1 may be formed in the portion of the window WN from which the strip WST is peeled off and separated.

The 1-1-th sub-groove SLT1_1 may be formed on the front surface WFP of the window WN to have a concave shape. When viewed in the second direction DR2, a depth of the 1-1-th sub-groove SLT1_1 in the third direction DR3 may increase as a distance from the center portion of the 1-1-th sub-groove SLT1_1 decreases (or toward a center portion of the 1-1-th sub-groove SLT1_1). The thickness of the window WN may decrease in the first processing area PA1. The thickness of the window WN may be smallest in the center portion of the first processing area PA1 when viewed in the second direction DR2.

The window WN may have a second thickness THK2 between a bottom surface of the window WN and the center portion of the first processing area PA1.

The second thickness THK2 may be adjusted by the power of the laser beam. As an example, as the power of the laser beam increases, the depth of the 1-1-th sub-groove SLT1_1 may increase, and as the depth of the 1-1-th sub-groove SLT1_1 increases, the second thickness THK2 may decrease. The second thickness THK2 may be equal to or smaller than about two-thirds (⅔) of the first thickness THK1. The second thickness THK2 may be in a range of about 20 μm to about 50 μm, however, it should not be limited thereto or thereby. The second thickness THK2 may be set in various ways.

Figure 9A:
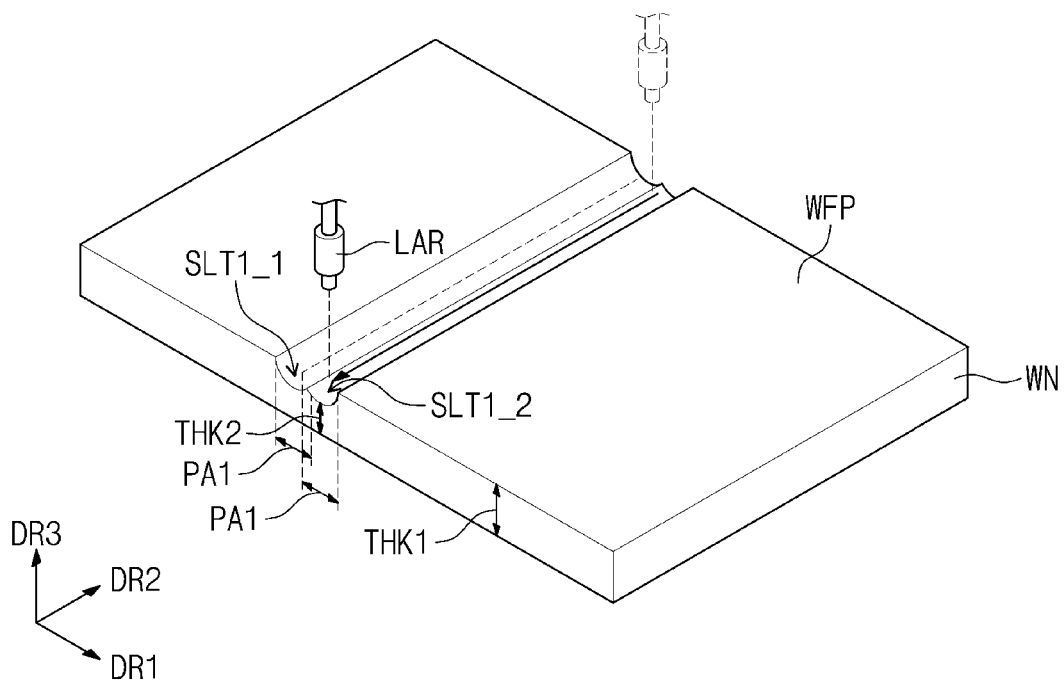
FIGS. 9A and 9B are views schematically illustrating a window processed by a laser beam.
Figure 9B:
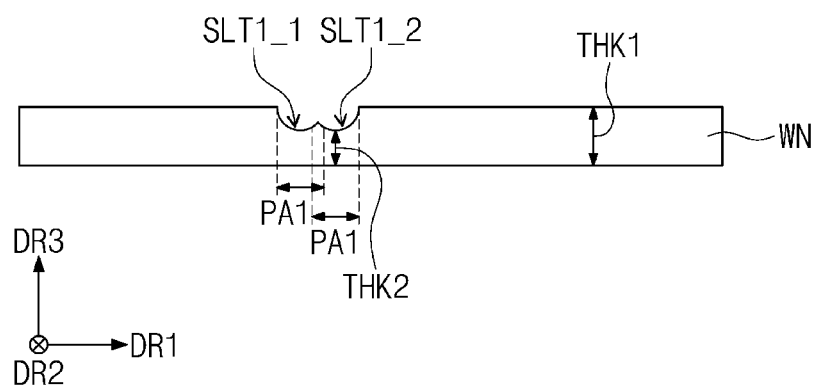

FIGS. 9A and 9B are views schematically illustrating a window WN processed by a laser beam.

As an example, FIG. 9B is a view schematically illustrating the window WN shown in FIG. 9A when the window WN is viewed in the second direction DR2.

FIGS. 9A and 9B are schematic views explaining a method of processing another first processing area PA1. As an example, a second first processing area PA1 on the leftmost side may be processed.

Referring to FIGS. 9A and 9B, after the first processing area PA1 is processed, the laser beam generator LAR may move in the first direction DR1 and may be disposed in the second first processing area PA1 on the leftmost side among the first processing areas PA1.

The laser beam generator LAR may provide the laser beam to the first processing area PA1 while moving in the second direction DR2 from another side surface of the first processing area PA1. The strip WST (refer to FIG. 8A) may be separated from the processed first processing area PA1, and a 1-2-th sub-groove SLT1_2 may be formed in the portion from which the strip WST is separated.

The 1-1-th sub-groove SLT1_1 and the 1-2-th sub-groove SLT1_2 may partially overlap each other. The 1-1-th sub-groove SLT1_1 and the 1-2-th sub-groove SLT1_2 may have substantially the same depth.

The 1-2-th sub-groove SLT1_2 may be formed on the front surface WFP of the window WN to have a concave shape. When viewed in the second direction DR2, a depth of the 1-2-th sub-groove SLT1_2 in the third direction DR3 may increase from an outer portion of the 1-2-th sub-groove SLT1_2 toward a center portion of the 1-2-th sub-groove SLT1_2. The thickness of the window WN may decrease in the first processing area PA1. The thickness of the window WN may be smallest in the center portion of the first processing area PA1 when viewed in the second direction DR2.

The thickness of the window WN in a portion where the 1-1-th sub-groove SLT1_1 and the 1-2-th sub-groove SLT1_2 of the first processing area PA1 overlap each other may be smaller than the first thickness THK1 of the window WN.

The thickness of the window WN in the portion where the 1-1-th sub-groove SLT1_1 and the 1-2-th sub-groove SLT1_2 overlap each other may have a value closer to that of the second thickness THK2 as the first processing areas PA1 overlap each other. The thickness of the window WN in the portion where the 1-1-th sub-groove SLT1_1 and the 1-2-th sub-groove SLT1_2 overlap each other may be equal to or smaller than the first thickness THK1 and may be equal to or greater than the second thickness THK2.

Figure 10:
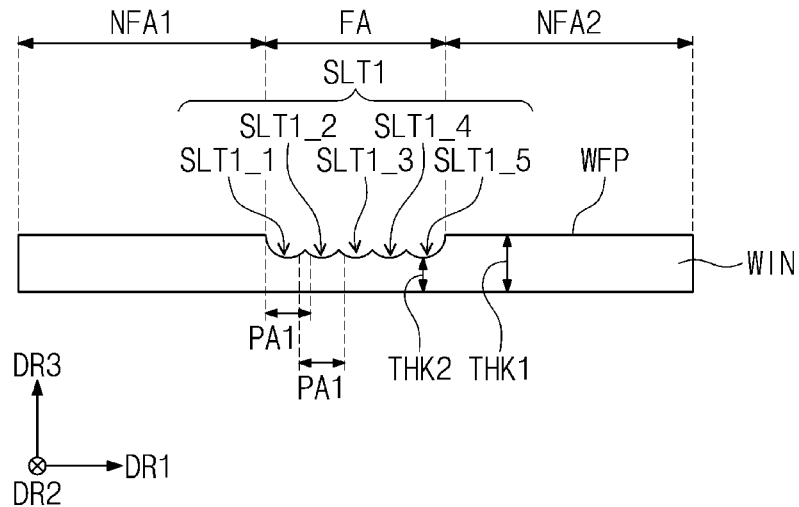
FIG. 10 is a view schematically illustrating a first groove formed by processing first processing areas.

FIG. 10 is a view schematically illustrating a first groove formed by processing the first processing areas.

As an example, FIG. 10 illustrates the window WIN when the window WIN is viewed in the second direction DR2.

Referring to FIG. 10, the 1-1-th sub-groove SLT1_1 and the 1-2-th sub-groove SLT1_2 shown in FIGS. 8B and 9A may be repeatedly formed by the laser beam generator LAR. As an example, in case that the laser beam is irradiated once, a 1-1-th sub-groove SLT1_1 may be formed. For example, in case that the laser beam generator LAR reciprocates once (or makes a round trip), two sub-grooves SLT1_1 and SLT1_2 may be formed.

As an example, the laser beam generator LAR may reciprocate one to five times to form first sub-grooves SLT1_1, SLT1_2, SLT1_3, SLT1_4, and SLT1_5, and a first groove SLT1 including the first sub-grooves SLT1_1, SLT1_2, SLT1_3, SLT1_4, and SLT1_5 may be defined. However, the number of reciprocations of the laser beam generator LAR should not be limited thereto or thereby.

FIG. 10 illustrates five first sub-grooves SLT1_1, SLT1_2, SLT1_3, SLT1_4, and SLT1_5, but the number of the first sub-grooves SLT1_1, SLT1_2, SLT1_3, SLT1_4, and SLT1_5 should not be limited thereto or thereby.

When the first groove SLT1 is viewed in the second direction DR2, a thickness of the first groove SLT1 may be greatest in the center portion of each of the first processing areas PA1 and may be smallest in the portion where the first processing areas PA1 overlap each other. The thickness of the first groove SLT1 may repeatedly increase and decrease in the first direction DR1. For example, the first groove SLT1 may have a wave pattern.

The thickness of the window WIN may be smaller than that of the non-folding portions NFA1 and NFA2 in the folding portion FA. The window WIN may have the first thickness THK1 in the non-folding portions NFA1 and NFA2, may have the second thickness THK2 in the center portion of each of the first processing areas PA1 of the folding portion FA, and may have a thickness equal to or smaller than the first thickness THK1 in the folding portion FA except the center portion of each of the first processing areas PA1 and equal to or greater than the second thickness THK2. Accordingly, the window WIN may be readily folded.

According to the disclosure, a thickness of glass in the folding portion FA of the window WIN may be smaller than that of the non-folding portions NFA1 and NFA2. The thickness of the non-folding portions NFA1 and NFA2 of the window WIN may be greater than that of the folding portion FA. Accordingly, since the non-folding portions NFA1 and NFA2 of the window WIN have a relatively great thickness, a strength and a surface quality of the window WIN may be improved in the non-folding portions NFA1 and NFA2. The folding portion FA of the window WIN has a relatively small thickness, and thus the window WIN may be readily folded in the folding portion FA.

According to the disclosure, since the laser beam is used to thin the folding portion FA of the window WIN, a chemical etching process to etch the folding portion FA may be omitted. Accordingly, since no hazardous substances are used in the manufacturing process, the environment that includes products and processes is safe and a process time is shortened. The $CO_2$ laser beam, which is a relatively low-cost compared with a picosecond laser beam or a femtosecond laser beam, is used, and thus a manufacturing cost may be reduced.

Figure 11:
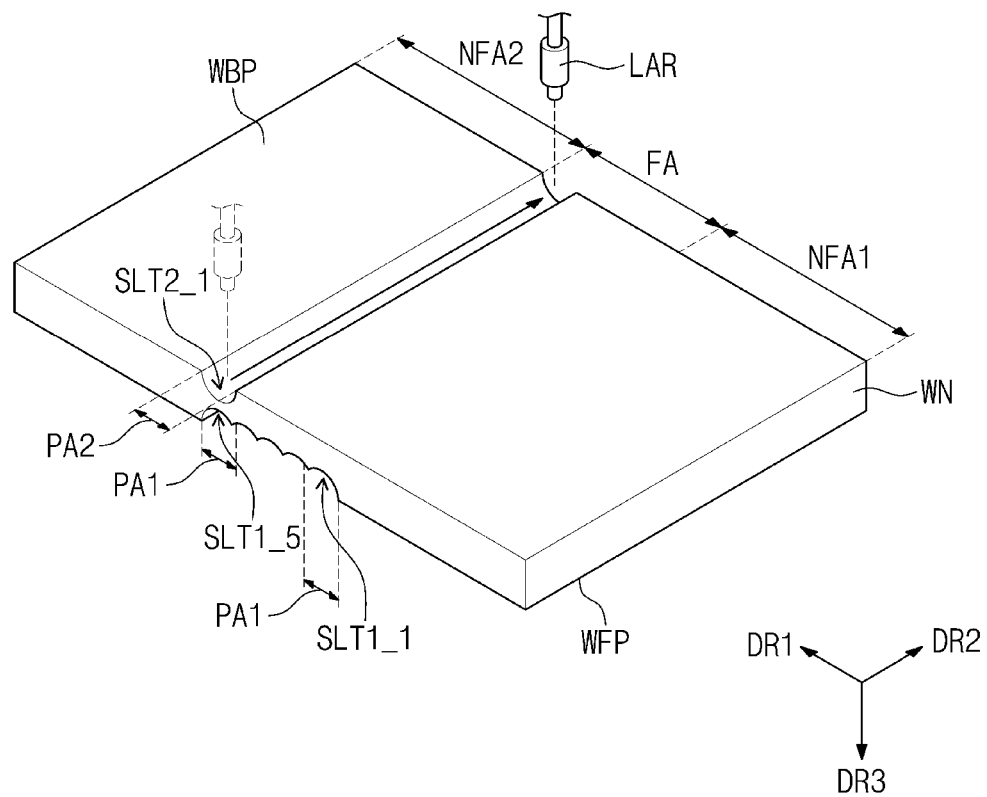
FIG. 11 is a view schematically illustrating a second processing area of a window, which is processed by a laser beam.

FIG. 11 is a view schematically illustrating a second processing area of the window WN, which is processed by the laser beam.

Referring to FIG. 11, a 2-1-th sub-groove SLT2_1 may be formed on a rear surface WBP of the window WN. The laser beam may be irradiated to the second processing area PA2 from a side surface of the second processing area PA2 to another side surface of the second processing area PA2. The 2-1-th sub-groove SLT2_1 may be formed in the processed second processing area PA2.

The 2-1-th sub-groove SLT2_1 may be formed on the rear surface WBP of the window WN to have a concave shape. When the window WN is viewed in the second direction DR2, a depth of the 2-1-th sub-groove SLT2_1 in third direction DR3 may increase from an outer portion of the 2-1-th sub-groove SLT2_1 toward a center portion of the 2-1-th sub-groove SLT2_1. The thickness of the window WN may decrease in the second processing area PA2. When the window WN is viewed in the second direction DR2, the thickness of the window WN may be smallest in the center portion of the second processing area PA2.

A curved surface of the 2-1-th sub-groove SLT2_1 may face a curves surface of the 1-5-th sub-groove SLT1_5 of the first processing area PA1.

Figure 12:
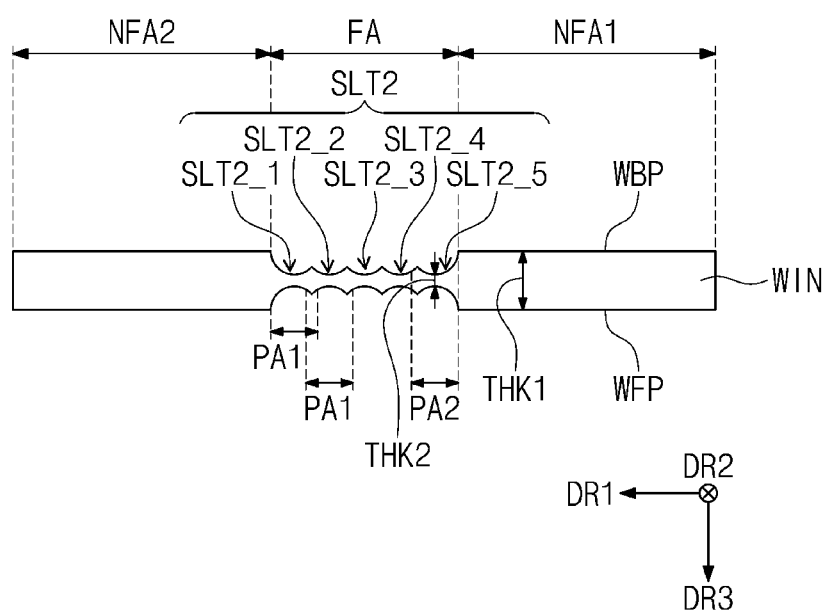
FIG. 12 is a view schematically illustrating first and second grooves formed by processing first processing areas and second processing areas.

FIG. 12 is a view schematically illustrating first and second grooves formed by processing the first processing areas and the second processing areas.

As an example, FIG. 12 illustrates the window WIN when the window WIN is viewed in the second direction DR2.

Referring to FIG. 12, the 2-1-th sub-groove SLT2_1 shown in FIG. 11 may be repeatedly formed by the laser beam generator LAR. As an example, in case that the laser beam irradiated once, a 2-1-th sub-groove SLT2_1 may be formed. For example, the laser beam generator LAR may reciprocate one to five times to form second sub-grooves SLT2_1, SLT2_2, SLT2_3, SLT2_4, and SLT2_5, and a second groove SLT2 including the second sub-grooves SLT2_1, SLT2_2, SLT2_3, SLT2_4, and SLT2_5 may be defined. However, the number of reciprocations of the laser beam generator LAR should not be limited thereto or thereby.

Wave grooves that define a wave pattern may be defined by the second sub-grooves SLT2_1, SLT2_2, SLT2_3, SLT2_4, and SLT2_5 and the first sub-grooves SLT1_1, SLT1_2, SLT1_3, SLT1_4, and SLT1_5 shown in FIG. 10.

The first groove SLT1 may be formed on the front surface WFP of the window WIN, and the second groove SLT2 may be formed on the rear surface WBP of the window WIN. The first groove SLT1 and the second groove SLT2 may correspond to each other with reference to the first direction DR1.

The second thickness THK2 may be defined between the center portion of the first groove SLT1 and the center portion of the second groove SLT2. The non-folding portions NFA1 and NFA2 of the window WIN may have the first thickness THK1, and the folding portion FA of the window WIN may have the second thickness THK2. Since the window WIN has a relatively small thickness in the folding portion FA than in the non-folding portions NFA1 and NFA2, the window WIN may be readily folded.

FIGS. 13A to 13D are views schematically illustrating windows WN and WIN according to embodiments.

Figure 13A:
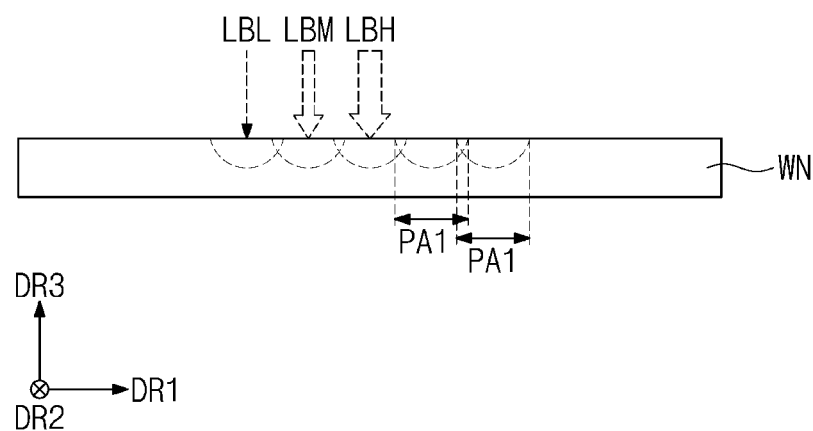
FIGS. 13A to 13D are views schematically illustrating windows according to embodiments of the disclosure.
Figure 13B:
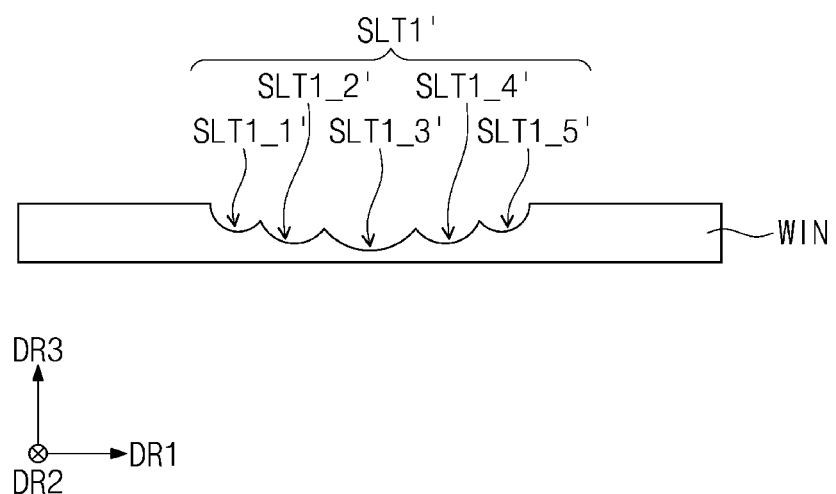

As an example, FIG. 13B illustrates a window WN processed in FIG. 13A when the window WN is viewed in the second direction DR2.

For the convenience of explanation, the same reference numerals denote the same elements of the windows WN and WIN shown in FIGS. 13A and 13B, and thus, detailed descriptions thereof will be omitted.

Referring to FIG. 13A, a first processing areas PA1 may be defined in the window WN. The first processing areas PA1 may correspond to the first processing areas PA1 shown in FIG. 7. The first processing areas PA1 may partially overlap each other.

Laser beams having different powers may be irradiated to the first processing areas PA1. As an example, the laser beam may be irradiated to a k-th first processing area PA1 in the second direction DR2 and then, may be irradiated to a k+1-th first processing area PA1 in the second direction DR2 after moving in the first direction DR1. In this case, the power of the laser beam irradiated to the k-th first processing area PA1 may be different from the power of the laser beam irradiated to the k+1-th first processing area PA1.

The power of the laser beam irradiated to the first processing areas PA1 may be equal to or greater than a first power and may be equal to or smaller than a second power greater than the first power.

When viewed in the second direction DR2, a low laser beam LBL having the first power may be irradiated to the first processing areas PA1 disposed at an outermost position. A high laser beam LBH having the second power may be irradiated to the first processing area PA1 disposed in a center portion of the window WN. A medium laser beam LBM having a power greater than the first power and smaller than the second power may be irradiated to the first processing areas PA1 between the first processing areas PA1 disposed at the outermost position and the first processing area PA1 of the center portion. For example, the power of the laser beam may be gradually changed (e.g., increased or decreased) from the first power to the second power as a distance from the center portion of the window WN changes (e.g., increases or decreases).

The first power may be in a range of about 20 W to about 30 W. The second power may be in a range of about 40 W to about 70 W. However, the disclosure is not limited thereto, and the first power and the second power of the laser beam may be set in various ways.

Since the low laser beam LBL, the medium laser beam LBM, and the high laser beam LBH have different powers from each other, the sizes and depths of grooves formed on the window WN may be different from each other.

Referring to FIGS. 13A and 13B, a 1-1-th sub-groove SLT1_1' and a 1-5-th sub-groove SLT1_5' may be formed in the first processing areas PA1 by the low laser beam LBL. A 1-2-th sub-groove SLT1_2' and a 1-4-th sub-groove SLT1_4' may be formed in the first processing areas PA1 by the medium laser beam LBM. A 1-3-th sub-groove SLT1_3' may be formed in the first processing area PA1 by the high laser beam LBH.

A first groove SLT1' including first sub-grooves SLT1_1', SLT1_2', SLT1_3', SLT1_4', and SLT1_5' may be defined in the first processing areas PA1.

The 1-2-th sub-groove SLT1_2' and the 1-4-th sub-groove SLT1_4' may have a size greater than that of the 1-1-th sub-groove SLT1_1' and the 1-5-th sub-groove SLT1_5' in the first direction DR1 and may have a depth greater than that of the 1-1-th sub-groove SLT1_1' and the 1-5-th sub-groove SLT1_5' in the third direction DR3. For example, a semi-circular shape defined by the 1-2-th sub-groove SLT1_2' and the 1-4-th sub-groove SLT1_4' may have a radius greater than that of a semi-circular shape defined by the 1-1-th sub-groove SLT1_1' and the 1-5-th sub-groove SLT1_5'.

The 1-3-th sub-groove SLT1_3' may have a size greater than that of the 1-2-th sub-groove SLT1_2' and the 1-4-th sub-groove SLT1_4' in the first direction DR1 and may have a depth greater than that of the 1-2-th sub-groove SLT1_2' and the 1-4-th sub-groove SLT1_4' in the third direction DR3. For example, a semi-circular shape defined by the 1-3-th sub-groove SLT1_3' may have a radius greater than that of a semi-circular shape defined by the 1-2-th sub-groove SLT1_2' and the 1-4-th sub-groove SLT1_4'. However, the shapes of the first sub-grooves SLT1_1', SLT1_2', SLT1_3', SLT1_4', and SLT1_5' are not limited thereto or thereby, and the first sub-grooves SLT1_1', SLT1_2', SLT1_3', SLT1_4', and SLT1_5' may have a variety of shapes, e.g., a quadrangular shape.

The first sub-grooves SLT1_1', SLT1_2', SLT1_3', SLT1_4', and SLT1_5' may partially overlap each other. The thickness of the window WIN may decrease as a distance from the center portion of the window WIN decreases because of to the first sub-grooves SLT1_1', SLT1_2', SLT1_3', SLT1_4', and SLT1_5' overlapping each other. The first groove SLT1' may have a wave pattern.

The window WIN may be readily folded by the first groove SLT1'.

Figure 13C:
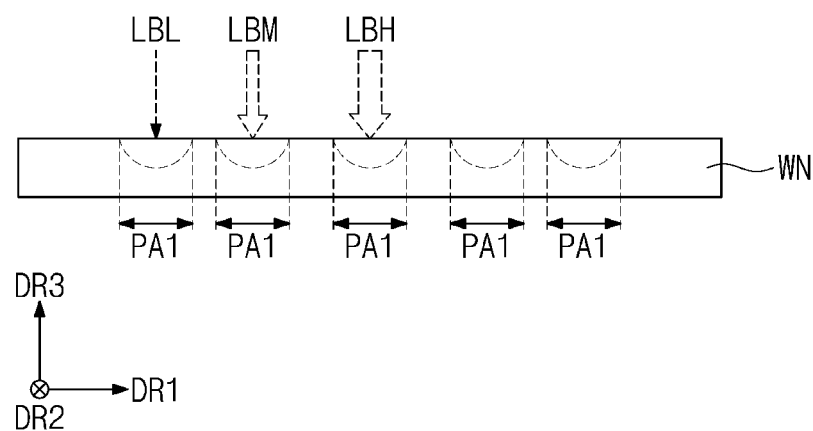

Referring to FIG. 13C, the first processing areas PA1 may be spaced apart from each other. A distance between the first processing areas PA1 may decrease from the center portion to the outer portion.

When viewed in the second direction DR2, the low laser beam LBL having the first power may be irradiated to the first processing areas PA1 disposed in the outermost position. The high laser beam LBH having the second power may be irradiated to the first processing area PA1 in the center portion. The medium laser beam LBM having the power greater than the first power and smaller than the second power may be irradiated to the first processing areas PA1 between the first processing areas PA1 disposed in the outermost portions and the first processing area PA1 disposed in the center portion. For example, the power of the laser beam may be gradually changed from the first power to the second power as a distance from the center portion of the window WN changes.

Figure 13D:
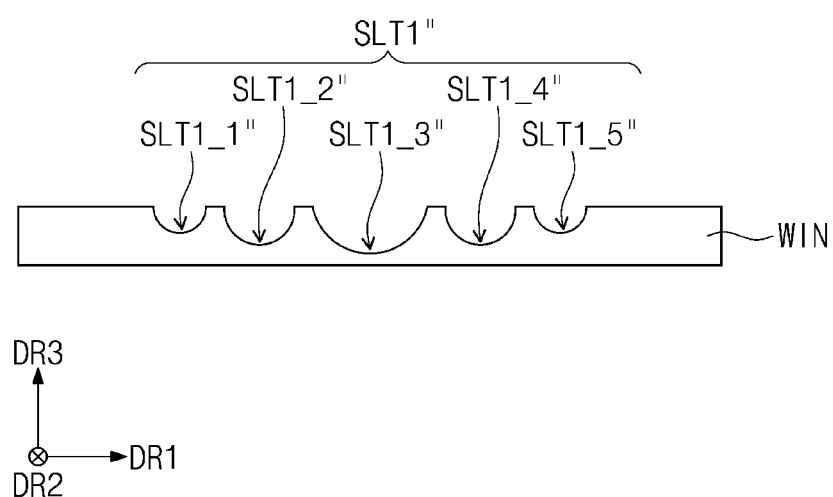

Referring to FIGS. 13C and 13D, a 1-1-th sub-groove SLT1_1" and a 1-5-th sub-groove SLT1_5" may be formed in the first processing areas PA1 by the low laser beam LBL. A 1-2-th sub-groove SLT1_2" and a 1-4-th sub-groove SLT1_4" may be formed in the first processing areas PA1 by the medium laser beam LBM. A 1-3-th sub-groove SLT1_3" may be formed in the first processing area PA1 by the high laser beam LBH.

A first groove SLT1" including the first sub-grooves SLT1_1", SLT1_2", SLT1_3", SLT1_4", and SLT1_5" may be defined in the first processing areas PA1.

The 1-2-th sub-groove SLT1_2" and the 1-4-th sub-groove SLT1_4" may have a size greater than that of the 1-1-th sub-groove SLT1_1" and the 1-5-th sub-groove SLT1_5" in the first direction DR1 and may have a depth greater than that of the 1-1-th sub-groove SLT1_1" and the 1-5-th sub-groove SLT1_5" in the third direction DR3. For example, a semi-circular shape defined by the 1-2-th sub-groove SLT1_2" and the 1-4-th sub-groove SLT1_4" may have a radius greater than that of a semi-circular shape defined by the 1-1-th sub-groove SLT1_1" and the 1-5-th sub-groove SLT1_5".

The first_3 sub-groove SLT1_3" may have a size greater than that of the 1-2-th sub-groove SLT1_2" and the 1-4-th sub-groove SLT1_4" in the first direction DR1 and may have a depth greater than that of the 1-2-th sub-groove SLT1_2" and the 1-4-th sub-groove SLT1_4" in the third direction DR3. For example, a semi-circular shape defined by the 1-3-th sub-groove SLT1_3" may have a radius greater than that of a semi-circular shape defined by the 1-2-th sub-groove SLT1_2" and the 1-4-th sub-groove SLT1_4". However, the shape of the first sub-grooves SLT1_1", SLT1_2", SLT1_3", SLT1_4", and SLT1_5" should not be limited thereto or thereby, and the first sub-grooves SLT1_1", SLT1_2", SLT1_3", SLT1_4", and SLT1_5" may have a variety of shapes, e.g., a quadrangular shape.

The first sub-grooves SLT1_1", SLT1_2", SLT1_3", SLT1_4", and SLT1_5" may be spaced apart from each other. The window WIN may be readily folded by the first sub-grooves SLT1_1", SLT1_2", SLT1_3", SLT1_4", and SLT1_5".

Figure 14:
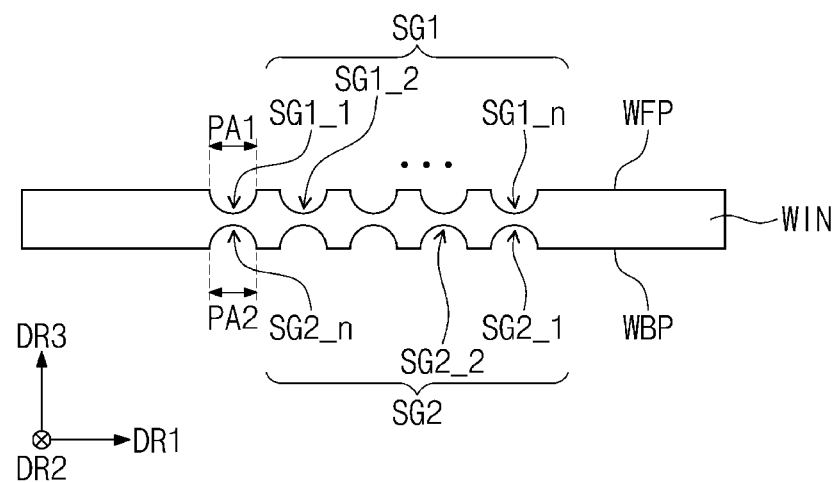
FIG. 14 is a view schematically illustrating a window according to an embodiment of the disclosure.

FIG. 14 is a schematic view illustrating a window WIN according to an embodiment.

In FIG. 14, for the convenience of explanation, the same reference numerals denote the same elements of the window WIN shown in FIG. 12, and thus, detailed descriptions of the same elements will be omitted.

Referring to FIG. 14, first processing areas PA1 of a front surface WFP of the window WIN may be spaced apart from each other in the first direction DR1. Second processing areas PA2 of a rear surface WBP of the window WIN may be spaced apart from each other in the first direction DR1.

The first processing areas PA1 of the front surface WFP of the window WIN and the second processing areas PA2 of the rear surface WBP of the window WIN may overlap each other. A laser beam may be irradiated to the first processing areas PA1, and first sub-grooves SG1_1 to SG1_n may be formed. The first sub-grooves SG1_1 to SG1_n may define a first groove SG1. A laser beam may be irradiated to the second processing areas PA2, and second sub-grooves SG2_1 to SG2_n may be formed. The second sub-grooves SG2_1 and SG2_n may define a second groove SG2.

The window WIN may be readily folded by the first groove SG1 and the second groove SG2.

Figure 15:
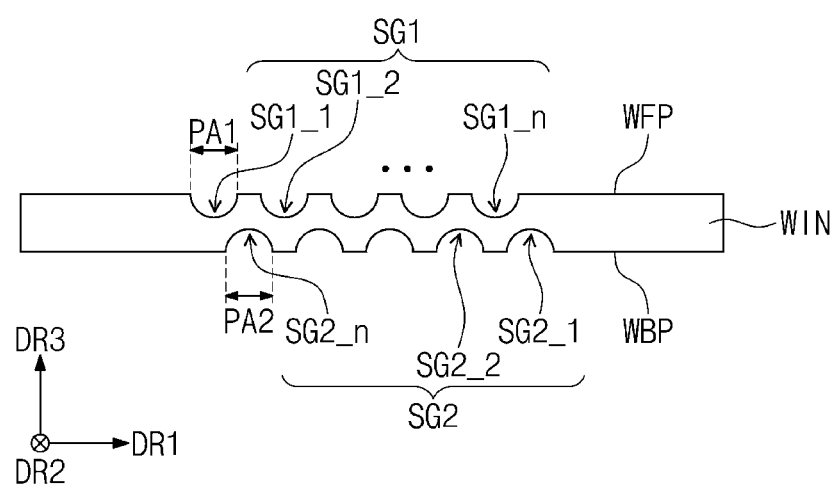
FIG. 15 is a view schematically illustrating a window according to an embodiment of the disclosure.

FIG. 15 is a schematic view illustrating a window WIN according to an embodiment.

In FIG. 15, for the convenience of explanation, the same reference numerals denote the same elements of the window WIN shown in FIG. 12, and thus, detailed descriptions of the same elements will be omitted.

Referring to FIG. 15, first processing areas PA1 of the front surface WFP of the window WIN may be arranged alternately with the second processing areas PA2 of the rear surface WBP of the window WIN. The first processing areas PA1 and the second processing areas PA2 may partially overlap each other.

First sub-grooves SG1_1 to SG1_n of the front surface WFP of the window WIN may be arranged alternately with second sub-grooves SG2_1 to SG2_n of the rear surface WBP of the window WIN.

The window WIN may be readily folded by a first groove SG1 and a second groove SG2.

Figure 16A:
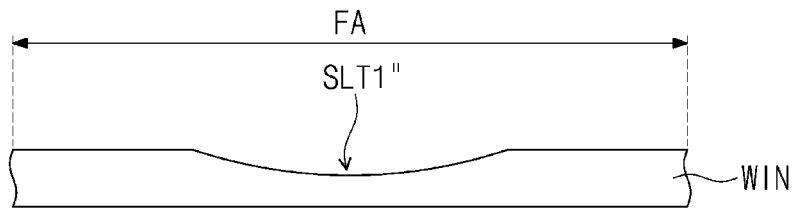
FIGS. 16A to 16C are views schematically illustrating windows according to embodiments of the disclosure.
Figure 16A:
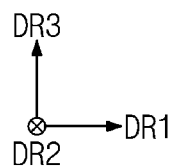
Figure 16B:
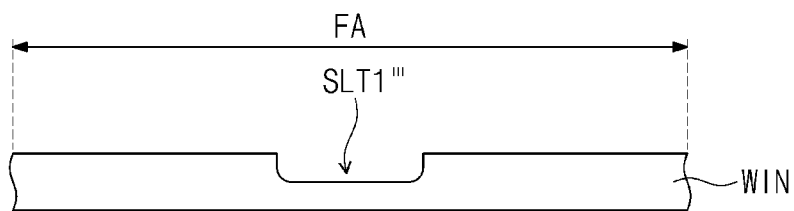
Figure 16B:
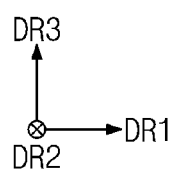

FIGS. 16A and 16B are views schematically illustrating windows WIN according to embodiments.

Figure 16C:
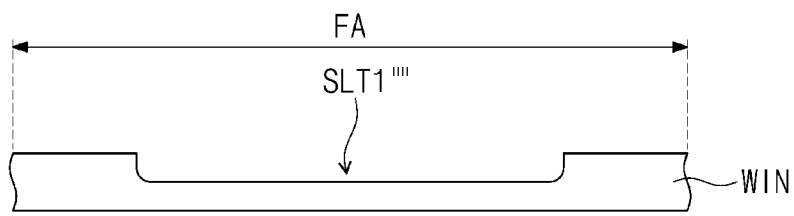
Figure 16C:
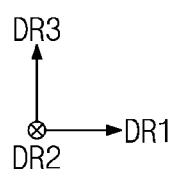

Referring to FIGS. 16A, 16B, and 16C, different grooves may be formed on a surface of the window WIN depending on a size of the laser beam, a power of the laser beam, and homogenization of the power of the laser beam.

Referring to FIG. 16A, a bottom surface of the first groove SLT1" may have a curved surface. The number of laser beam irradiation times to form the first groove SLT1" may be smaller than the number of laser beam irradiation times to form the first groove SLT shown in FIG. 10. The first groove SLT1" may have an oval shape having a width that increases in the third direction DR3 as a distance from a center portion of the window WIN decreases.

Referring to FIG. 16B, a bottom surface of the first groove SLT1''' may have a curved surface. The first groove SLT1''' may have a quadrangular shape having a long side in the first direction DR1, short sides in the second direction DR2, and a connection portion between the long side and the short sides, and the connection portion may have a curved surface.

By the processes shown in FIGS. 8A to 10, first grooves SLT1''' may be formed in the folding portion FA.

Referring to FIG. 16C, the number of laser beam irradiation times to form the first groove SLT1'''' may be smaller than the number of laser beam irradiation times to form the first groove SLT1''' shown in FIG. 16B. The first groove SLT1'''' may have a shape similar to the quadrangular shape of the first groove SLT1'''.

According to an embodiment, the size and shape of a groove may be changed by adjusting a laser beam. Accordingly, the thickness of the window WIN may be readily controlled.

Figure 17A:
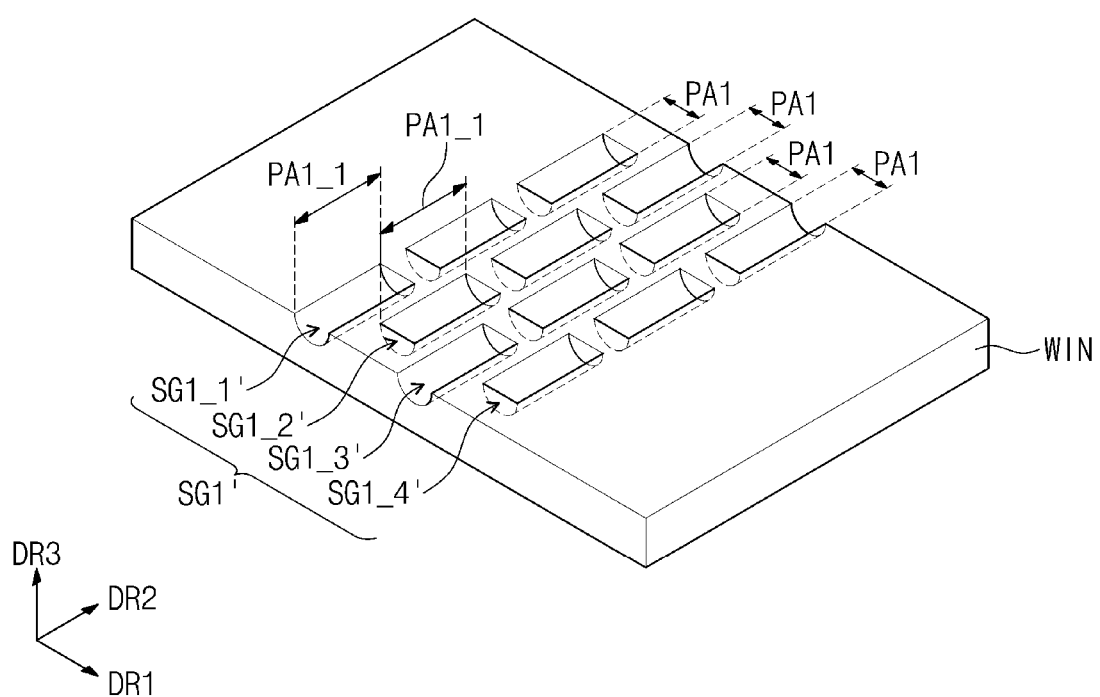
FIGS. 17A and 17B are views schematically illustrating windows according to embodiments of the disclosure.
Figure 17B:
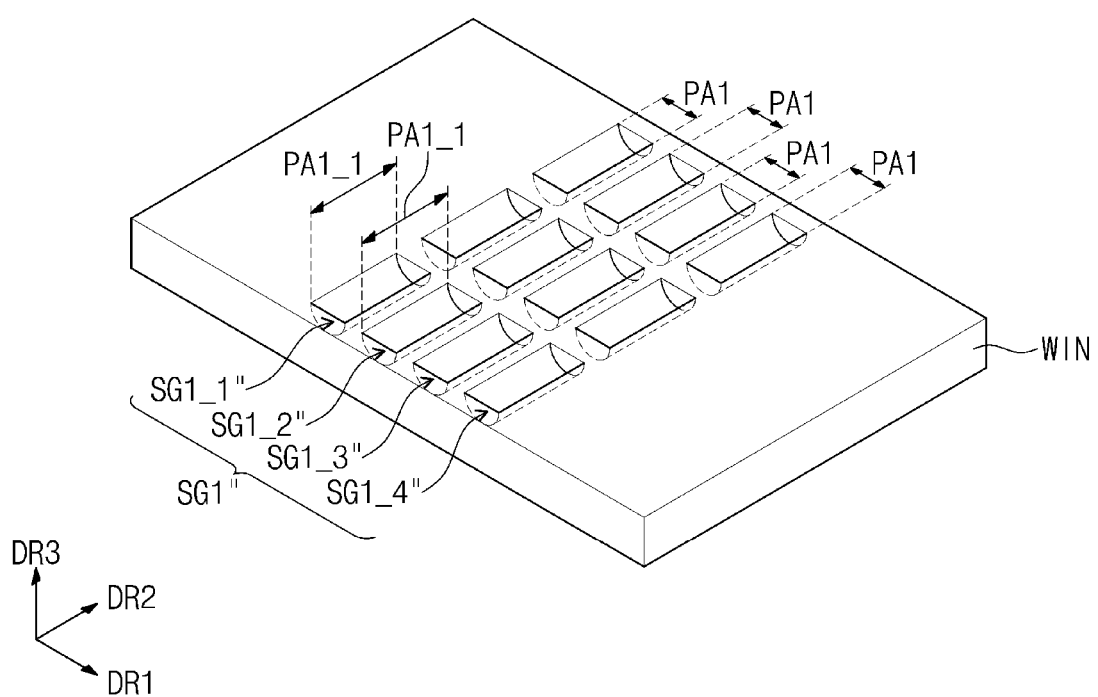

FIGS. 17A and 17B are views schematically illustrating windows WIN according to embodiments.

For the convenience of explanation, four first processing areas PA1 are shown in FIG. 17A, but the number of the first processing areas PA1 should not be limited to four.

The first processing areas PA1 may be arranged in the first direction DR1 and may be spaced apart from each other. As an example, a k-th first processing area PA1 may include first sub-processing areas PA1_1 arranged in the second direction DR2 and spaced apart from each other. The k-th first sub-processing areas PA1_1 may be arranged alternately with k+1-th first sub-processing areas PA1_1.

A laser beam may be irradiated at least once to each of the first sub-processing areas PA1_1, and thus, dot-type grooves may be formed. The dot-type grooves may include first sub-grooves SG1_1', SG1_2', SG1_3', and SG1_4'. The first sub-grooves SG1_1', SG1_2', SG1_3', and SG1_4' may be formed in the portion of the first sub-processing areas PA1_1, from which the strip WST (refer to FIG. 8A) is peeled off.

The first sub-grooves SG1_1', SG1_2', SG1_3', and SG1_4' may define a first groove SG1'.

The window WIN may be readily folded by the first groove SG1'.

For the convenience of explanation, four first processing areas PA1 are shown in FIG. 17B, however, the number of the first processing areas PA1 should not be limited to four.

The first processing areas PA1 may be arranged in the first direction DR1 and may be spaced apart from each other. As an example, a k-th first processing area PA1 may include first sub-processing areas PA1_1 arranged in the second direction DR2 and spaced apart from each other. The k-th first sub-processing areas PA1_1 may overlap k+1-th first sub-processing areas PA1_1 in the first direction DR1.

A laser beam may be irradiated at least once to each of the first sub-processing areas PA1_1, and dot-type grooves may be formed. The dot-type grooves may include first sub-grooves SG1_1", SG1_2", SG1_3", and SG1_4". The first sub-grooves SG1_1", SG1_2", SG1_3", and SG1_4" may be formed in the portion of the first sub-processing areas PA1_1, from which the strip WST (refer to FIG. 8A) is peeled off and separated.

The first sub-grooves SG1_1", SG1_2", SG1_3", and SG1_4" may define a first groove SG1".

The window WIN may be readily folded by the first groove SG1".

Although the embodiments of the disclosure have been described, it is understood that the disclosure should not be limited to these embodiments but various changes and modifications can be made by one ordinary skilled in the art within the spirit and scope of the disclosure. Therefore, the disclosed subject matter should not be limited to any single embodiment described herein, and the scope of the claimed invention shall be determined according to the attached claims.

What is claimed is:

1. A method of manufacturing a window, comprising:
   providing a window comprising a first non-folding portion, a second non-folding portion, and a folding portion disposed between the first and second non-folding portions; and
   irradiating a laser beam to a front surface of the folding portion of the window to form a first groove in the front surface of the folding portion, wherein
   the first non-folding portion, the second non-folding portion and the folding portion are arranged in the window in a first direction,
   a plurality of first processing areas extending in a second direction intersecting the first direction and arranged in the first direction are defined in the front surface of the folding portion,
   the plurality of first processing areas overlap each other in the first direction, and
   the laser beam is irradiated at least once to each of the plurality of first processing areas in the second direction.

2. The method of claim 1, wherein the laser beam comprises a $CO_2$ laser beam.

3. The method of claim 2, wherein the laser beam has a wavelength in a range of about 9 μm to about 11 μm.

4. The method of claim 1, wherein the laser beam has a power in a range of about 20 W to about 70 W.

5. The method of claim 1, wherein a power of the laser beam irradiated to the plurality of first processing areas is uniformly maintained.

6. The method of claim 1, wherein the laser beam is irradiated to a k-th first processing area among the plurality of first processing areas in the second direction and is moved in the first direction to be irradiated to a k+1-th first processing area among the plurality of first processing areas in the second direction, where k is a natural number.

7. The method of claim 1, wherein
   the laser beam is irradiated to a k-th first processing area among the plurality of first processing areas in the second direction and is moved in the first direction to be irradiated to a k+1-th first processing area among the plurality of first processing areas in the second direction, where k is a natural number, and
   the laser beam irradiated to the k-th first processing area has a power different from a power of the laser beam irradiated to the k+1-th first processing area.

8. The method of claim 1, wherein
   the laser beam having the first power is irradiated to a first processing area disposed at an outermost position among the plurality of first processing areas,
   the laser beam having the second power is irradiated to a first processing area disposed at a center portion among the plurality of first processing areas, and
   the second power is greater than the first power.

9. The method of claim 8, wherein the power of the laser beam is gradually changed from the first power to the second power from the first processing area disposed at the outermost position to the first processing area disposed at the center portion.

10. The method of claim 1, wherein a bottom surface defined in the first groove is a curved surface or a flat surface.

11. A method of manufacturing a window, comprising:
    providing a window comprising a first non-folding portion, a second non-folding portion, and a folding portion disposed between the first and second non-folding portions; and
    irradiating a laser beam to a front surface of the folding portion of the window to form a first groove in the front surface of the folding portion,
    irradiating the laser beam to a rear surface of the folding portion to form a second groove in the rear surface of the folding portion, which is opposite to the front surface of the folding portion, wherein
    the first non-folding portion, the second non-folding portion and the folding portion are arranged in the window in a first direction,
    a plurality of first processing areas extending in a second direction intersecting the first direction and arranged in the first direction are defined in the front surface of the folding portion,
    a plurality of second processing areas extending in the second direction and arranged in the first direction is defined in the rear surface of the folding portion,
    the plurality of first processing areas overlap each other in the first direction,
    the laser beam is irradiated at least once to each of the plurality of first processing areas in the second direction, and
    the laser beam is irradiated at least once to each of the plurality of second processing areas in the second direction.

12. The method of claim 11, wherein the plurality of second processing areas partially overlaps each other in the first direction.

13. The method of claim 11, wherein the first groove and the second groove, which are formed by processing the first and second processing areas, have a wave pattern.

14. A method of manufacturing a window, comprising:
providing a window comprising a first non-folding portion, a second non-folding portion, and a folding portion disposed between the first and second non-folding portions; and
irradiating a laser beam to a front surface of the folding portion of the window to form a first groove in the front surface of the folding portion,
irradiating the laser beam to a rear surface of the folding portion to form a second groove in the rear surface of the folding portion, which is opposite to the front surface of the folding portion, wherein
the first non-folding portion, the second non-folding portion and the folding portion are arranged in the window in a first direction,
a plurality of first processing areas extending in a second direction intersecting the first direction and arranged in the first direction are defined in the front surface of the folding portion,
the plurality of first processing areas are spaced apart from each other in the first direction,
a plurality of second processing areas extending in the second direction and arranged in the first direction is defined in the rear surface of the folding portion,
the plurality of second processing areas are spaced apart from each other in the first direction,
the laser beam is irradiated at least once to each of the plurality of first processing areas in the second direction, and
the laser beam is irradiated at least once to each of the plurality of second processing areas in the second direction.

15. The method of claim 14, wherein the plurality of second processing areas overlaps the plurality of first processing areas in a plan view.

16. The method of claim 14, wherein the plurality of second processing areas are arranged alternately with the plurality of first processing areas in a plan view.

17. The method of claim 14, wherein
the first groove comprises a plurality of first sub-grooves formed by the plurality of first processing areas,
the second groove comprises a plurality of second sub-grooves formed by the plurality of second processing areas,
the plurality of first sub-grooves are spaced apart from each other in the first direction, and
the plurality of second sub-grooves are spaced apart from each other in the first direction.

18. The method of claim 14, wherein
a k-th first processing area among the plurality of first processing areas comprises a plurality of first sub-processing areas arranged in the second direction and spaced apart from each other, where k is a natural number, and
the laser beam is irradiated at least once to the plurality of first sub-processing areas to allow the first groove to comprise dot-type first sub-grooves.

* * * * *